(12) United States Patent  (10) Patent No.: US 9,187,326 B2
Chen et al.  (45) Date of Patent: Nov. 17, 2015

(54) PROCESS TANK FOR PRODUCING INSOLUBLE SULFUR

(75) Inventors: Xinmin Chen, Shanghai (CN); Dezhu Wang, Shanghai (CN); Luxin Wang, Shanghai (CN)

(73) Assignee: Jiangsu Sinorgchem Technology Co., Ltd., Taizhou, Jiangsu Province (CN)

( * ) Notice: Subject to any disclaimer, the term of this patent is extended or adjusted under 35 U.S.C. 154(b) by 677 days.

(21) Appl. No.: 13/461,773

(22) Filed: May 1, 2012

(65) Prior Publication Data

US 2013/0052122 A1 Feb. 28, 2013

(30) Foreign Application Priority Data

Aug. 29, 2011 (CN) .......................... 2011 1 0252421

(51) Int. Cl.
 *C01B 17/12* (2006.01)
(52) U.S. Cl.
 CPC ...................................... *C01B 17/12* (2013.01)
(58) Field of Classification Search
 CPC ....................................................... C01B 17/12
 USPC ....................................... 422/261; 423/567.1
 See application file for complete search history.

(56) References Cited

U.S. PATENT DOCUMENTS

| 3,532,160 | A | * | 10/1970 | Garrison | ................... | 165/159 |
| 4,019,962 | A | * | 4/1977 | Allen et al. | ............... | 435/301.1 |
| 2006/0163260 | A1 | * | 7/2006 | Schmidt | ..................... | 220/565 |

FOREIGN PATENT DOCUMENTS

CN 201058813 Y 5/2008
CN 201240848 Y 5/2009

OTHER PUBLICATIONS

English machine translation of Xu et al. CN 201240848. May 20, 2009.*

* cited by examiner

*Primary Examiner* — Sean E Conley
*Assistant Examiner* — Donald Spamer
(74) *Attorney, Agent, or Firm* — Manni Li; Mei & Mark LLP

(57) ABSTRACT

A process tank for producing insoluble sulfur comprising a tank body having an upper half portion a lower half portion a first end and a second end along the longitudinal axis; an inner semi-cylinder body inside the upper half portion; and a first filter plate in the lower half portion. The space between the inner semi-cylinder body and the tank body is a sandwich structure and an inner cavity independent of the sandwich structure is provided inside the tank body. The first filter plate is wavelike in the cross section which separates from the inner cavity a first filter liquid cavity. A first liquid outlet communicating with the first filter liquid cavity is provided on the tank body.

18 Claims, 5 Drawing Sheets

PROCESS TANK FOR PRODUCING INSOLUBLE SULFUR

CROSS-REFERENCE AND RELATED APPLICATION

The subject application claims priority on Chinese patent application No. 201110252421.X filed on Aug. 29, 2011. The contents and subject matter of the Chinese priority application is incorporated herein by reference.

TECHNICAL FIELD OF THE INVENTION

The present invention relates to an apparatus for making insoluble sulfur, particularly, a process tank for making insoluble sulfur.

BACKGROUND OF THE INVENTION

Insoluble sulfur generally refers to sulfur insoluble in carbon disulfide. Insoluble sulfur is polymeric in nature, and the polymer chain is made up of up to several thousand sulfur atoms. Insoluble sulfur is widely used as a vulcanizing and crosslinking agent in rubber compound formulations. Insoluble sulfur is produced by the solvent method in which carbon bisulfide is used as the solvent. Carbon bisulfide is inflammable, combustible, hazardous, and poisonous, thus, it requires extreme safety precautions for the production process.

Chinese Patent No. CN201058813Y discloses an integrated treatment apparatus for making insoluble sulfur, including stirring and mixing, slaking, filtering, extracting, and vacuum drying. The apparatus has a porous semi-cylindrical filter screen and a filter plate for filtration, however, the surface area for filtering is inadequate yet the parts occupy large volume in the apparatus with onerous arrangement.

Chinese Patent No. CN201240848Y discloses a multifunctional tank for producing insoluble sulfur. The upper half of the inner space of the outer cylinder in the apparatus functions as an area for passing heating and cooling medium, and the lower half functions as an independent filtering cavity comprised of an inner cylindrical body, an outer cylindrical body, and two partition boards between the middle portion of the two cylindrical bodies. The inner cylindrical body functions as a filter plate in the filtering cavity, and a plurality of porous pressure plates are fixed along the radian inside the inner cylindrical body. The filter screen is arranged between the inner cylindrical body and the pressure plates. The surface area of the apparatus for filtering is inadequate and the speed is slow. These apparatus have the drawback of slow filtering rate, long wash and dry time, and low production efficiency, which make them unsuitable for industrial production.

SUMMARY OF THE INVENTION

The present invention provides a process tank for producing insoluble sulfur with improved filtering efficiency.

The process tank of the present invention comprises a tank body having an upper half portion, a lower half portion, and a first end and a second end along the longitudinal axis; an inner semi-cylinder body inside the upper half portion of the tank body; and a first filter plate fixed in the lower half portion of the tank body. In the upper half portion, the space between the tank body and the inner semi-cylinder body forms a sandwich structure, while inside the tank body, there is an inner cavity that is isolated from the sandwich structure. The inner semi-cylinder body does not extend to the lower half portion of the tank body. The first filter plate is arranged on the lower half portion in the tank body along the longitudinal axis of the tank body, and the cross section of the first filter plate is wavelike. The first filter plate separates the inner cavity and causes to form a first filter liquid cavity which communicates with a first liquid outlet on the tank body for discharging liquid.

The process tank of the present invention further comprises a second filter plate that is arranged at one end of the process tank and inside the tank body. The second filter plate is substantially perpendicular to the longitudinal axis of the tank body. The second filter plate divides the inner cavity of the tank body into two cavities along the axis and a second filter liquid cavity forms on the opposite side of the second filter plate. The second filter liquid cavity may be independent of the first filter liquid cavity, i.e., do not communicate with the first filter liquid cavity, or connect with the first filter liquid cavity so that they form one cavity. A second liquid outlet is provided on the tank body which communicates with the second filter liquid cavity for discharging liquid.

The process tank of the present invention further comprises a plurality of spiral plates that are arranged on the inner wall of the inner semi-cylinder body at an interval, and each of the spiral plates has an inner cavity, an inlet, and an outlet on the connecting surface between the spiral plate and the inner wall of the inner semi-cylinder body.

The process tank of the present invention further comprises a baffle plate in the sandwich structure which divides the space into a water inflow passage and a water outflow passage. The water inflow and outflow passages are separate from each other. The inlet and the outlet of the spiral plate communicate with the water inflow and outflow passages, respectively.

Further, the first filter plate may be fixed by pipe supports, and the two ends of the pipe support respectively connect with the water inflow and outflow passages.

Further, the cross section of the first filter plate is zigzag-shaped. Moreover, multiple first filter plates may be arranged in the tank body, each of which may be fixed by the pipe supports on both sides.

Further, the first end of the tank body has a first sealing head on which a material outlet is provided that communicates with the inner cavity. The second end of the tank body has a second sealing head on which a vacuum port is provided that communicates with the inner cavity.

Further, a first manhole is formed in the middle of the first sealing head; the material outlet is positioned to be below the first manhole. A second manhole is formed in the middle of the second sealing head; the vacuum port is on the second manhole.

Further, the first and second sealing heads may be a single- or double-layered structure.

Further, one or more reserved openings which communicate with the inner cavity are located on the side wall of the upper half portion of the tank body.

Further, the present invention provides a method for making insoluble sulfur by using the process tank of the present invention.

Reference numbers used in the figures correspond to the following structures:

| | | |
|---|---|---|
| 1—supporting roller | 2—material discharge outlet | 3—viewcup |
| 4—reserve opening | 5—gearwheel | 6—feed inlet |
| 7—spiral plate | 7a—inlet | 7b—outlet |
| 8—supporting rail | 9a—first manhole | 9b—second manhole |
| 10a—water inlet | 10b—water outlet | 11—vacuum port |
| 12—second filter plate | 13a—first liquid outlet | 13b—second liquid outlet |
| 14a—first filter liquid cavity | 14b—second filter liquid cavity | 15—blocking-wheel |
| 16—reduction unit | 17—pinion | 18—first filter plate |
| 19—tank body | 19a—first sealing head | 19b—second sealing head |
| 20—inner semi-cylinder body | 21—partition board | 22—pipe support |
| 23—baffle plate | 23a—water inflow passage | 23b—water outflow passage |
| 24—sandwich structure | 25—inner cavity | |

DETAILED DESCRIPTION OF THE INVENTION

In the present invention, the process tank for producing insoluble sulfur has a tank body having an upper half portion, a lower half portion, and a first end and a second end along the longitudinal axis; an inner semi-cylinder body on the upper half portion of the tank body; and a first filter plate being arranged at the lower half portion of the tank body along the longitudinal axis of the tank body and the cross section of the first filter plate is wavelike. The upper half portion of the tank body is a double-layered structure where a sandwich structure is formed between the inner semi-cylinder body and the inner wall of the tank body. An inner cavity independent of the sandwich structure, i.e., does not communicate with the sandwich structure, forms inside the tank body. The first filter plate separates the inner cavity to form a first filter liquid cavity, and a first liquid outlet communicating with the first filter liquid cavity is provided on the tank body. The arrangement of the wavelike first filter plate effectively increases the surface area for filtration and improves the filtering efficiency.

The longitudinal axis of the tank body refers to the axis of the process tank around which the process tank rotates while in working conditions. The axis is shown in the dotted line in FIG. 1.

Figure 1:
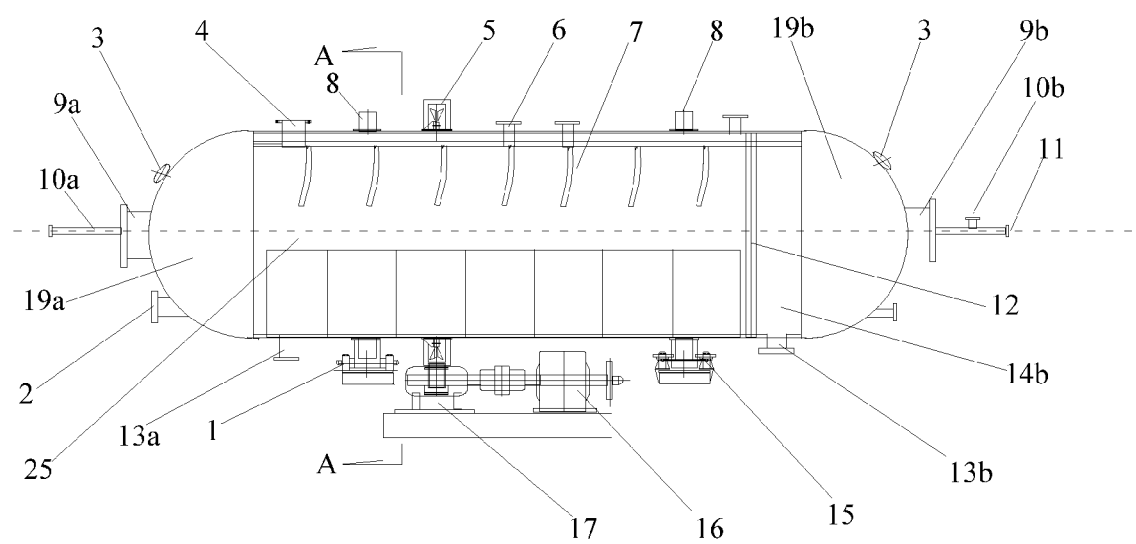
FIG. 1 shows the structure of the process tank of one embodiment of the present invention.

As shown in FIG. 1, the process tank lays on the ground horizontally and has a motor, a reduction unit 16, two supporting rails 8, four supporting rollers 1, a blocking-wheel 15, a gearwheel 5, and a pinion 17, all arranged on the outer circumference of the tank body 19. The transmission gear of the tank body 19 is a gear pair, and the transmission mode is gear transmission. The gearwheel 5 is positioned on the left to the center of the tank body 19, the pinion 17 coordinates with the motor, and the reduction unit 16 is positioned below the tank body 19. One of the supporting rails 8 is positioned on the four supporting rollers 1 and used for support, and the other supporting rail 8 coordinates with the blocking-wheel 15 to prevent the movement of the tank body 19 along the axis. Therefore, the forward and reverse rotation of the tank body 19 are more stable and smooth.

The process tank has a tank body 19, an inner semi-cylinder body 20 in the upper portion of the tank body 19, and a first filter plate 18 in the lower half portion of the tank body 19 (not shown in FIG. 1). A feed inlet 6 is on the side wall of the tank body 19 for feeding materials. The upper half portion of the tank body 19 is a double-layered structure, as the space between the outer wall of the inner semi-cylinder body 20 and the inner wall of the tank body 19 forms a sandwich structure 24. An inner cavity 25 is inside the tank body 19 independent of the sandwich structure 24.

In one embodiment, the process tank comprises a second filter plate 12 that is arranged substantially perpendicular to the longitudinal axis of the tank body inside the tank body. The second filter plate 12 divides the inner cavity 25 along the axis of the tank body 19 to form a second filter liquid cavity 14b which communicates with a second liquid outlet 13b on the tank body 19. The arrangement allows part of the solvent, i.e., carbon disulfide or water, to directly flows out of the tank body via the second filter plate 12, the second filter liquid cavity 14b, and the second liquid outlet 13b without ever passing through the solid insoluble sulfur which are mostly loaded and precipitated on the first filter plate and the first filter plate. Therefore, the filtration time is reduced and efficiency is improved.

Figure 7:
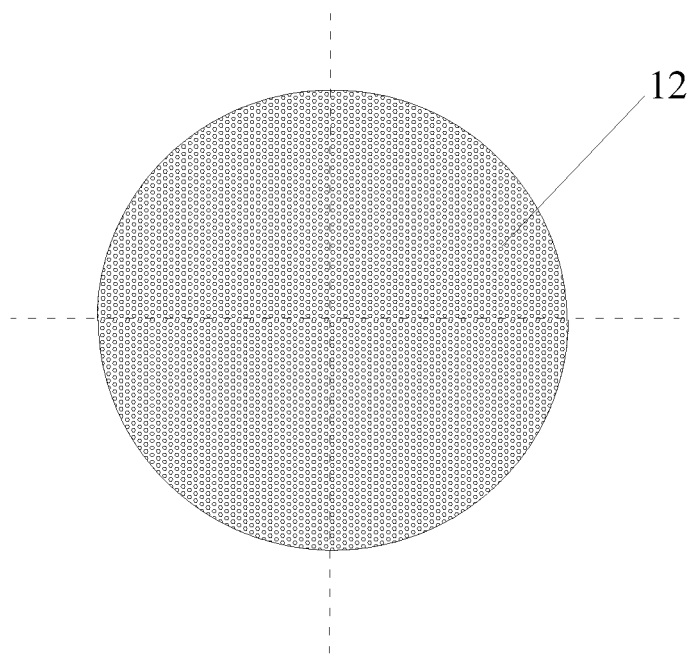
FIG. 7 shows the structure of the second filter plate of the process tank of the present invention.

FIG. 7 shows that the structure of second filter plate which fits in the cross section of the tank body. In another embodiment, the lower edge of the second filter plate 12 is connected to the first filter plate 18 so that the first filter liquid cavity 14a and the second filter liquid cavity 14b form one cavity. Then, only one liquid outlet is required to communicate with the cavity for discharging liquid.

As shown in FIG. 1, a water inlet 10a and a water outlet 10b are located on the tank body 19: the water inlet 10a is located on the first manhole 9a and communicates with the sandwich structure 24 through a pipeline; the water outlet 10b is located on the second manhole 9b and communicates with the sandwich structure 24 through a pipeline. The heating and cooling medium passes through the sandwich structure 24 of the process tank.

Figure 2:
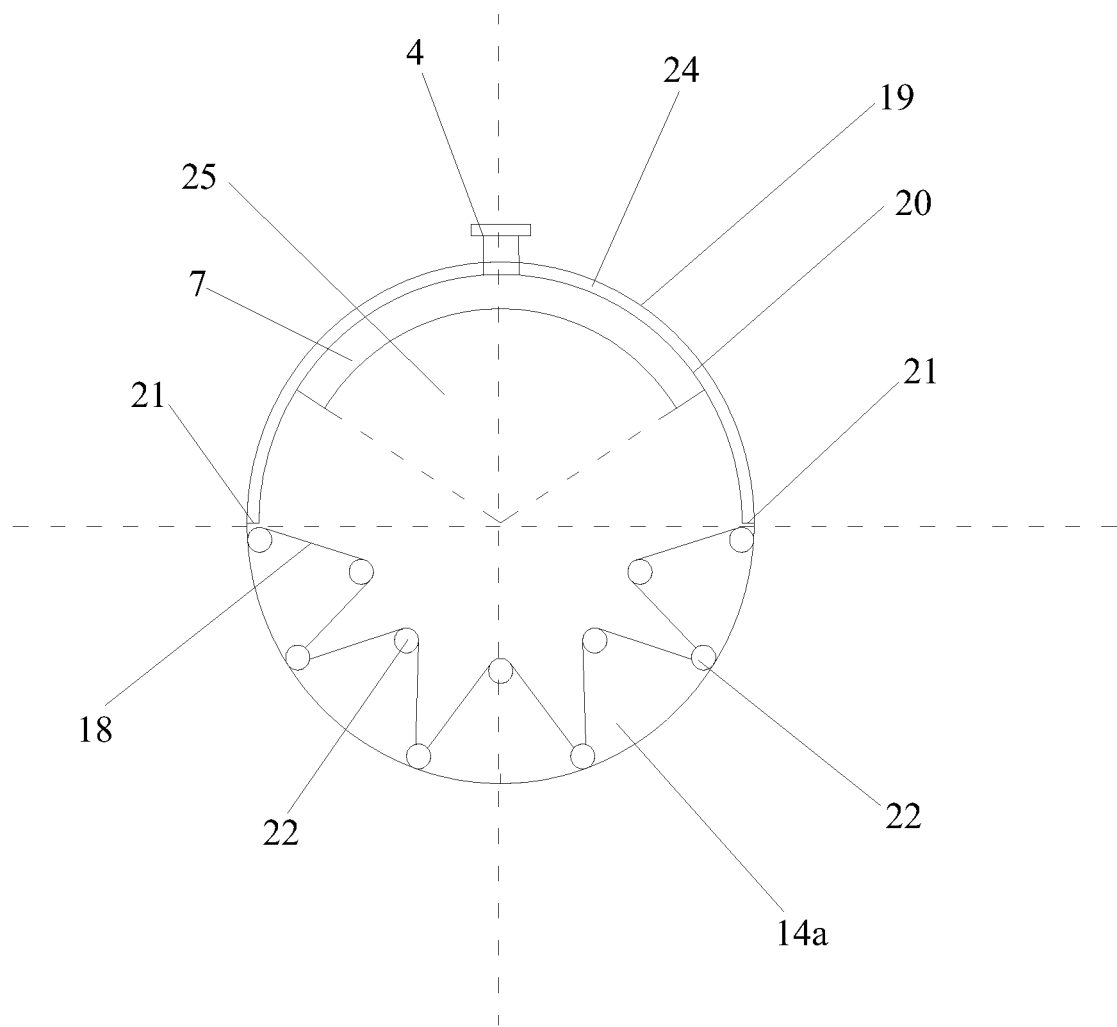
FIG. 2 shows the cross section view (along the A-A direction to the left) of the process tank as shown in FIG. 1.

As shown in FIG. 2, the first filter plate 18, which is wavelike in the cross section, is arranged at the lower half of the tank body 19 along the longitudinal axis of the tank body. The first filter plate 18 separates the inner cavity 25 to form a first filter liquid cavity 14a. A first liquid outlet 13a is provided on the tank body 19 which communicates with the first filter liquid cavity 14a for discharging liquid. The wavelike profile of the first filter plate 18 may be curve-shaped, zigzag shaped, or a combination thereof. When the cross section of the first filter plate 18 is wavelike as such, it increases the surface area for filtration and thus the filtering efficiency. A partition board 21 is arranged between the tank body 19 and the inner semi-cylinder body 20, which separates the sandwich structure 24 from the inner cavity 25.

Figure 3:
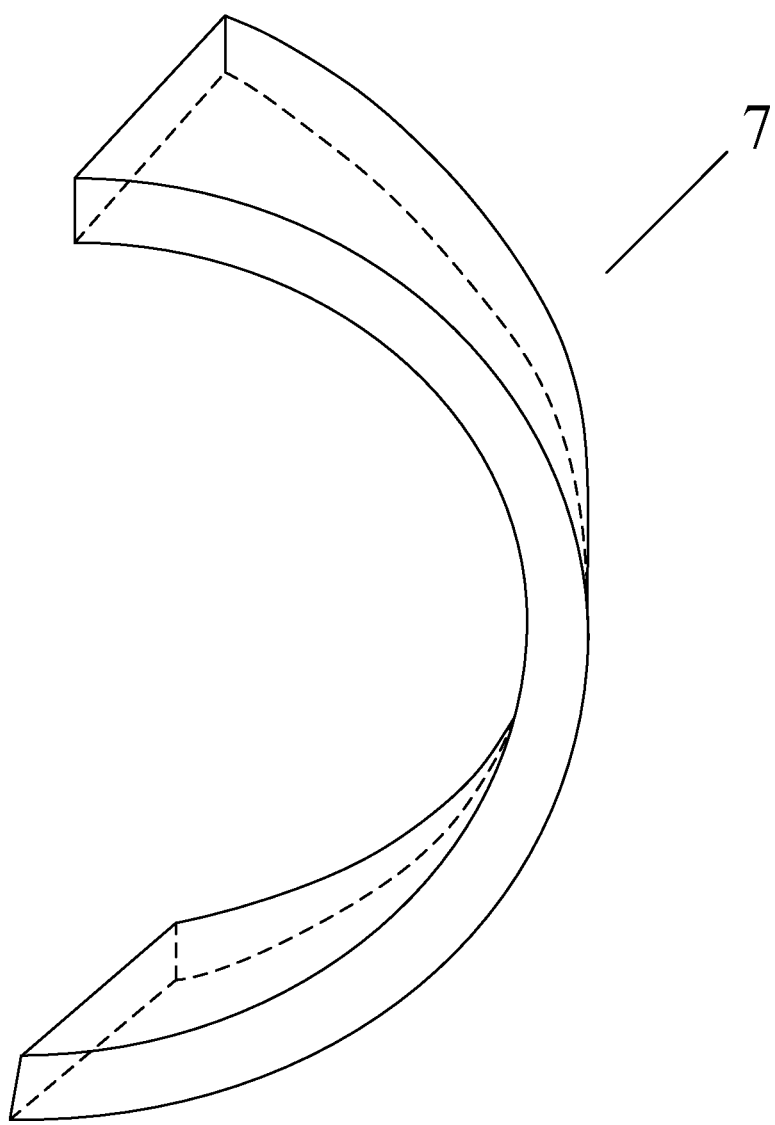
FIG. 3 shows the three-dimensional outline of the structure of a spiral plate of the process tank of the present invention.

As shown by the sector-shaped dotted lines in FIG. 2, the spiral plate 7 is positioned with a width that is within a range of about 60 to 180 degree at the upper half portion of the inner semi-cylinder body 20. Preferably, a plurality of the spiral plates 7 are independently arranged at an interval on the inner wall of the inner semi-cylinder body 20. There is no requirements for the length of the interval between the spiral plates. One of ordinary skilled in the art would be able to determine the length of the interval based on the number of spiral plates that is desirable to use and the length of the tank body for the installation of the spiral plates. As shown in FIG. 3, the spiral plate 7 has convoluted surfaces. Preferably, the spiral plate 7 is positioned to deviate from the vertical direction at an angle of 45 degree to facilitate repeated stirring and discharging of the material.

Figure 4:
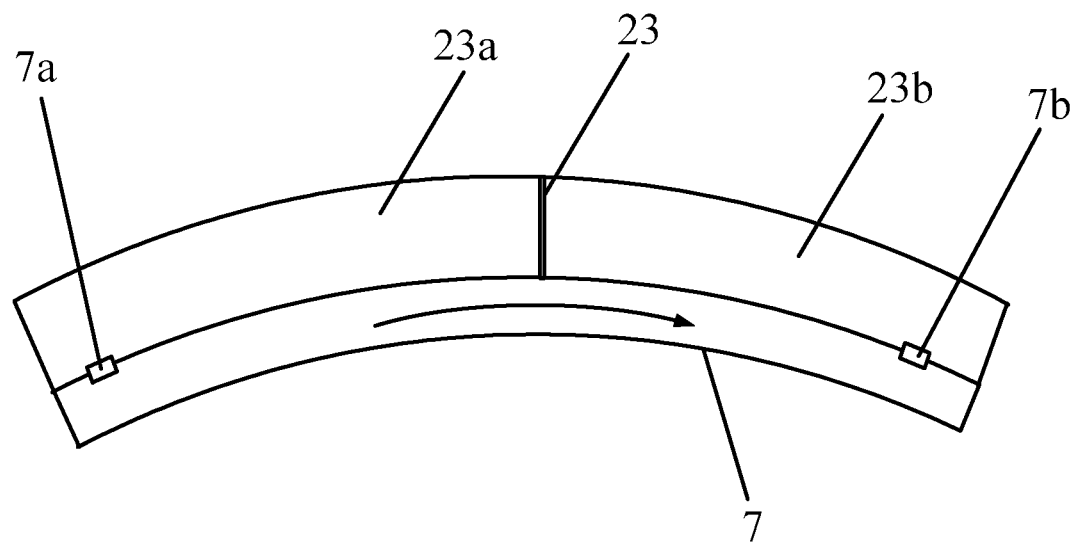
FIG. 4 shows the cross section view of the spiral plate as shown in FIG. 3.

As shown in FIG. 4, the process tank has a baffle plate 23 in the sandwich structure 24 which divides the inner space of the sandwich structure 24 into two separate passages, the water inflow passage 23a and the water outflow passage 23b. The spiral plate 7 has an inner cavity and an inlet 7a and outlet 7b formed on the connection surface between the spiral plates 7 and the inner wall of the inner semi-cylinder body 20. The inlet 7a and the outlet 7b of the spiral plate 7 respectively connect to the water inflow passage 23a and the water outflow passage 23b of the sandwich structure. Through the inlet 7a and outlet 7b, each spiral plate 7 is directly connected to the sandwich structure 24. Therefore, the heating and cooling medium can directly flow into the inner cavity of each spiral plate 7 following the direction of the arrow in FIG. 4, and directly heats or cools down the inside of the insoluble sulfur without external heating or cooling device. In addition, the medium, such as water, for heating and cooling may be recycled. The apparatus is simple and environmental friendly, the surface area for heating and cooling is increased, and the surface area for heating and cooling is uniform.

The spiral plate provides the following advantage to the process tank: first, as the spiral plate has an inner cavity which is connected to the water passages, the heating and cooling medium, water or others, may flow through the inner cavity and heart or cool down the material effectively; second, the shape and arrangement of the spiral plates facilitate mixing and washing of the materials in the inner cavity of the tank body while the process tank rotates along the axis; third, the shape and arrangement of the spiral plates facilitate discharge of the finished products, insoluble sulfur, from the inner cavity of the tank body.

Figure 5:
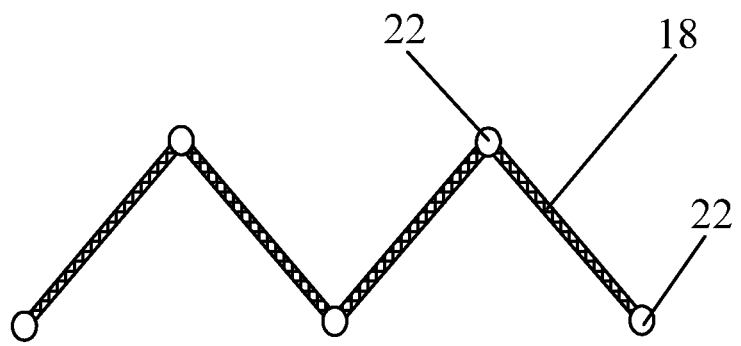
FIG. 5 shows the cross section view of the first filter plate of the process tank of the present invention.
Figure 6:
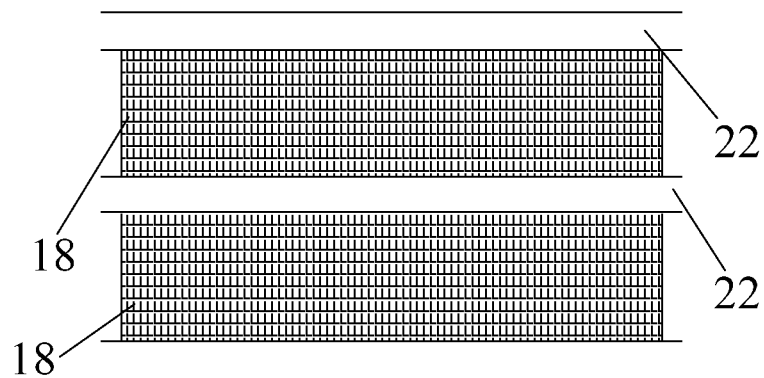
FIG. 6 shows an elevated view of the first filter plate as shown in FIG. 5.

As shown in FIGS. 2, 5, and 6, the first filter plate 18 is fixed through the pipe supports 22, and the two ends of each pipe support 22 may respectively communicate with the water inflow passage 23a and the water outflow passage 23b. The arrangement further increases the surface area for heating and cooling. Additionally, the heating or cooling medium may flow into the pipe supports 22 to directly heat or cool the inside of the insoluble sulfur which ensures that the insoluble sulfur is more evenly heated or cooled. With the combination of negative pressure operation via the vacuum port 11 at the tank body 19, the drying speed is accelerated. Therefore, the production efficiency is improved, and the industrial production is facilitated.

Preferably, the cross section of the first filter plate 18 in the lower half portion of the tank body 19 is zigzag shaped. Multiple filter plates 18 may be arranged in the lower half portion of the tank body 19 with the same shape and each of filter plates 18 may be fixed by the pipe support 22 on both sides. The structure is simple and easy to assemble.

Preferably, as shown in FIG. 1, the first end of the tank body 19 has a first sealing head 19a, and a material discharge outlet 2 is formed on the first sealing head 19a which communicates with the inner cavity 25. The second end of the tank body 19 has a second sealing head 19b, and a vacuum port 11 is formed on the second sealing head 19b which communicates with the inner cavity 25. To facilitate the observation of the condition inside the tank body 19, viewcups 3 are arranged on the tank body. Preferably, three viewcups 3 are arranged at the two sealing heads, with one viewcup 3 at the first sealing head 19a, and two viewcups at the second sealing head 19b. The condition of the material inside the tank body 19 is clearly known through the observation from both sides.

Preferably, as shown in FIG. 1, a first manhole 9a is provided in the middle of the first sealing head 19a, and a second manhole 9b is provided in the middle of the second sealing head 19b. The manholes 9a and 9b are convenient for the maintenance and repair of the process tank. The material discharge outlet 2 is positioned below the first manhole 19a so as to achieve more thorough discharge during the rotational discharge of the tank body 19. The vacuum port 11 is positioned on the second manhole 9b and may be used as a nitrogen port for allowing nitrogen to be introduced so as to protect the environment of the production.

Preferably, the first sealing head 19a is a single- or double-layered structure, and the second sealing head 19b is a single- or double layered structure.

Preferably, as shown in FIG. 1, a reserve opening 4 communicated with the inner cavity 25 is arranged on the side wall of the upper half portion of the tank body 19. The reserve opening 4 may be used not only as a feed or discharge port but also as an access port for maintenance and repair as well as water inlet or outlet or a vacuum exhaust opening. There may be one or more reserve openings 4 on the tank body 19.

The process of making insoluble sulfur by the process tank of the present invention has 4 major steps. First, sulfur is preheated and quenched with a solvent. Commercially available sulfur is preheated to above 195° C., preferably, 400 to 700° C., and more preferably, 400 to 450° C. Then, preheated sulfur is thoroughly mixed with the solvent at low temperature of about 0 to 30° C. before the mixture is fed into the process tank. The weight percentage of preheated sulfur to the solvent is about 1:10 to 1:20 in the mixture.

Second, prior to the feeding of the mixture, the inside of the tank body is cooled to about 10° C. by circulating cool water, and the solvent, water or carbon bisulfide, is fed through the feed inlet into the inner cavity of the tank body until the solvent occupies about ⅓ to ½ of the volume of the inner cavity. The volume should not exceed ½ of the inner cavity. Then, the mixture of quenched sulfur and solvent is fed through the feed inlet into the tank, and the fed amount of sulfur is about 2.5 metric ton sulfur per 10 m$^3$ volume of the process tank. The feeding step is conducted continuously in about 4 hours. As the mixture is continuously fed into the tank, the mixture deposits on the first filter plate.

Third, the mixture is repeatedly washed in the process tank. As the process tank rotates along the axis, the temperature inside is heated to about 50° C. to 80° C. The treatment process lasts about 2 hours while the sulfur inside is turned to smaller pellets and powder. The mixture occupies about 80% of the total volume of the process tank. At the end of the washing step, the process tank stops rotation and stands still while the sulfur material precipitates onto the first filter plate within a few minutes. Then, the first and second liquid outlets are open and the solvent with soluble sulfur is drained and discharged through the first and second filter plates and the first and second liquid outlets. The part of the solvent on the top of the solid material goes through the second filter plate and second liquid outlet without passing through the precipitated insoluble sulfur and the first filter plate. Thus, the filtration and draining process is accelerated and the reaction time is reduced. Then, fresh solvent is replenished to about ⅔ of the total volume of the tank and the step of washing is repeated. The process tank rotates for about 3 hours and then, the solvent with soluble sulfur is drained. The treatment step is repeated multiple times, preferably 3 times.

Fourth, the finished product, insoluble sulfur, is discharged from the process tank. While the process tank rotates, the pressure inside the inner cavity of the tank body is reduced to vacuum condition, and the heating medium, such as hot water, is circulating into the system so that the inside of the tank body is heated to about 50° C. to 70° C. while being vacuum dried for about 6 to 8 hours. Then, the temperature of the tank body is allowed to cool down to room temperature, around 20° C. to 30° C., and the first manhole is opened to discharge the finished product. While the tank rotates, the spiral plates help pushing the material out of the tank. While the residual material may be further discharged though the material discharge outlet that is positioned below the first manhole.

The arrangement of the dual filter plates in the present invention fully take advantage of the space inside the tank body. With the dual filter plates arranged in the directions that are substantially perpendicular to each other, the surface areas for filtration inside the tank body are greatly increased and the filtering efficiency is greatly increased. Therefore, the reaction time for filtering is reduced.

The heating and cooling medium, water, is fed into the process tank through the water inlet on the first manhole of the first sealing head and flows to the water inflow passage in the sandwich structure. Then, water flows into the inner cavity of the spiral plate through the inlet of the spiral plate and flows out of the inner cavity of the spiral plate through the outlet and flows into the water outflow passage of the sandwich structure. Additionally, water flows from the water inflow passage of the sandwich structure into one end of the pipe support for the first filter plates and flows out from the other end of the pipe support and back to the water outflow passage of the sandwich structure. Finally, water flows out of the process tank and is discharged through the water outlet at the second manhole of the second sealing head. As the medium passes through the inner cavity of the spiral plates as well as the inside of the pipe support, it directly heat or cool down the inside of the sulfur without the need for external heating or cooling device. After the medium is discharged from the tank body, it is recycled and reused.

The process tank of the present invention is useful for treating and producing insoluble sulfur. However, the process tank may also be used for similar treatment processes which require the washing and filtering steps and is not limited to treating insoluble sulfur. The advantage of the process tank is to increase the surface areas for filtering, effectively handle mixing and discharging, increase efficiency, and reduce time.

The description of the embodiments does not limit the scope of the invention, while one of skilled in the art may modify the invention without departing from the scope of the invention.

We claim:

1. A process tank comprising
   a tank body having an upper half portion a lower half portion, a first end and a second end along a longitudinal axis,
   an inner semi-cylinder body inside the upper half portion of the tank body which does not extend to the lower half portion of the tank body,
   a partition board being arranged between the tank body and the inner semi-cylinder body,
   a sandwich structure formed between the inner semi-cylinder body and the upper half portion of the tank body,
   a baffle plate in the sandwich structure for dividing inner space of the sandwich structure into a water inflow passage and a water outflow passage,
   an inner cavity inside the tank body being separated from the sandwich structure by the partition board,
   a first filter plate in the lower half portion of the tank body and having a cross section, the first filter plate being affixed to the tank body through pipe supports along the longitudinal axis of the tank body,
   the multiple pipe supports having a first end and a second end for affixing the first filter plate to the tank body along the longitudinal axis of the tank body,
   a first filter liquid cavity being formed between the first filter plate multiple pipe supports, and the lower half portion of the tank body the first filter liquid cavity being separated from the inner cavity by the first filter plate,
   a first liquid outlet on the tank body communicating with the first filter liquid cavity, and
   a feed inlet on side wall of the tank body,
   wherein the cross section of the first filter plate is zigzag shaped so as to increase contact surface on the first filter plate for filtration.

2. The process tank according to claim 1, further comprising
   a second filter plate inside the tank body substantially perpendicular to the longitudinal axis of the tank body and fitting in a cross section of the tank body,
   a second filter cavity separated from the inner cavity by the second filter plate, and
   a second liquid outlet on the tank body communicating with the second filter liquid cavity.

3. The process tank according to claim 2, wherein an edge of the second filter plate is connected to the first filter plate so that the first filter liquid cavity and the second filter liquid cavity form one cavity, and one liquid outlet is used to communicate with the one cavity.

4. The process tank according to claim 1, further comprising
   a plurality of spiral plates independent of each other arranged on the inner wall of the inner semi-cylinder body,
   wherein each of the spiral plate having an inner cavity, and an inlet and an outlet formed on adjacent connecting surface between the spiral plate and the inner wall of the inner semi-cylinder body, and
   each spiral plate is directly connected to the sandwich structure through the inlet and the outlet to allow a liquid heating or cooling medium to directly flow into the inner cavity of the spiral plate.

5. The process tank according to claim 4, wherein the spiral plate has convoluted surfaces and is arranged with an arc length within a range of from about 60 to 180 degree at the upper half portion.

6. The process tank according to claim 4, wherein the spiral plate is positioned so that it deviates from the vertical direction at an angle of about 45 degree.

7. The process tank according to claim 4,
   wherein the inlet and the outlet of the spiral plate respectively communicate with the water inflow passage and the water outflow passage of the sandwich structure.

8. The process tank according to claim 7, wherein the first and the second ends of the pipe support respectively communicate with the water inflow passage and the water outflow passage of the inner space of the sandwich structure.

9. The process tank according to claim 1, further comprising multiple first filter plates that are curved shaped in the lower half portion of the tank body and being affixed to the tank body through pipe supports along the longitudinal axis of the tank body.

10. The process tank according to claim 1, further comprising
multiple first filter plates are arranged in the lower half portion each of which is fixed with pipe supports on both sides.

11. The process tank according to claim 1, further comprising
a first sealing head at the first end of the tank body,
a material discharge outlet communicating with the inner cavity on the first sealing head
a second sealing head at the second end of the tank body, and
a vacuum port communicating with the inner cavity on the second sealing head.

12. The process tank according to claim 11, further comprising
a first manhole in the middle of the first sealing head, and
a second manhole in the middle of the second sealing head,
wherein the material discharge outlet is below the first manhole; and the vacuum port is provided at the second manhole.

13. The process according to claim 11, further comprising
a water inlet on the first manhole which communicates with the sandwich structure through pipeline, and
a water outlet on the second manhole which communicates with the sandwich structure through pipeline.

14. The process tank according to claim 11, wherein the first sealing head is a single- or double-layered structure, and the second sealing head is a single- or doublelayered structure.

15. The process tank according to claim 11, further comprising
one or more viewcups on the first or the second sealing head, or both for viewing conditions inside the tank body.

16. The process tank according to claim 1, further comprising
a reserve opening on a side wall of the upper half portion and communicating with the inner cavity.

17. The process tank according to claim 1, further comprising
a motor,
a reduction unit,
supporting rails,
supporting rollers,
a blocking-wheel,
a gearwheel, and
a pinion,
wherein the gearwheel is positioned on a left to the center of the tank body; the pinion coordinates with the motor; and the reduction unit is positioned below the tank body; one of the supporting rails is positioned on the supporting rollers and used for support, and other supporting rail coordinates with the blocking-wheel to prevent movement of the tank body along the longitudinal axis.

18. A process for producing insoluble sulfur by the process tank of claim 1, comprising the steps of
preheating sulfur to about 400° C. to 700° C. and quenching preheated sulfur with a cool solvent to form a mixture,
filling the inner cavity of the process tank with the cooled solvent up to one half of volume and feeding the mixture into the inner cavity while rotating the process tank along the longitudinal axis,
heating the mixture at 50° C. to 80° C. inside the inner cavity, discharging the solvent with soluble sulfur, while rotating the process tank, and replenishing the solvent and repeating the heating and discharging operation to obtain insoluble sulfur in the process tank, and
vacuum drying and discharging the insoluble sulfur from the process tank.

\* \* \* \* \*